United States Patent Office

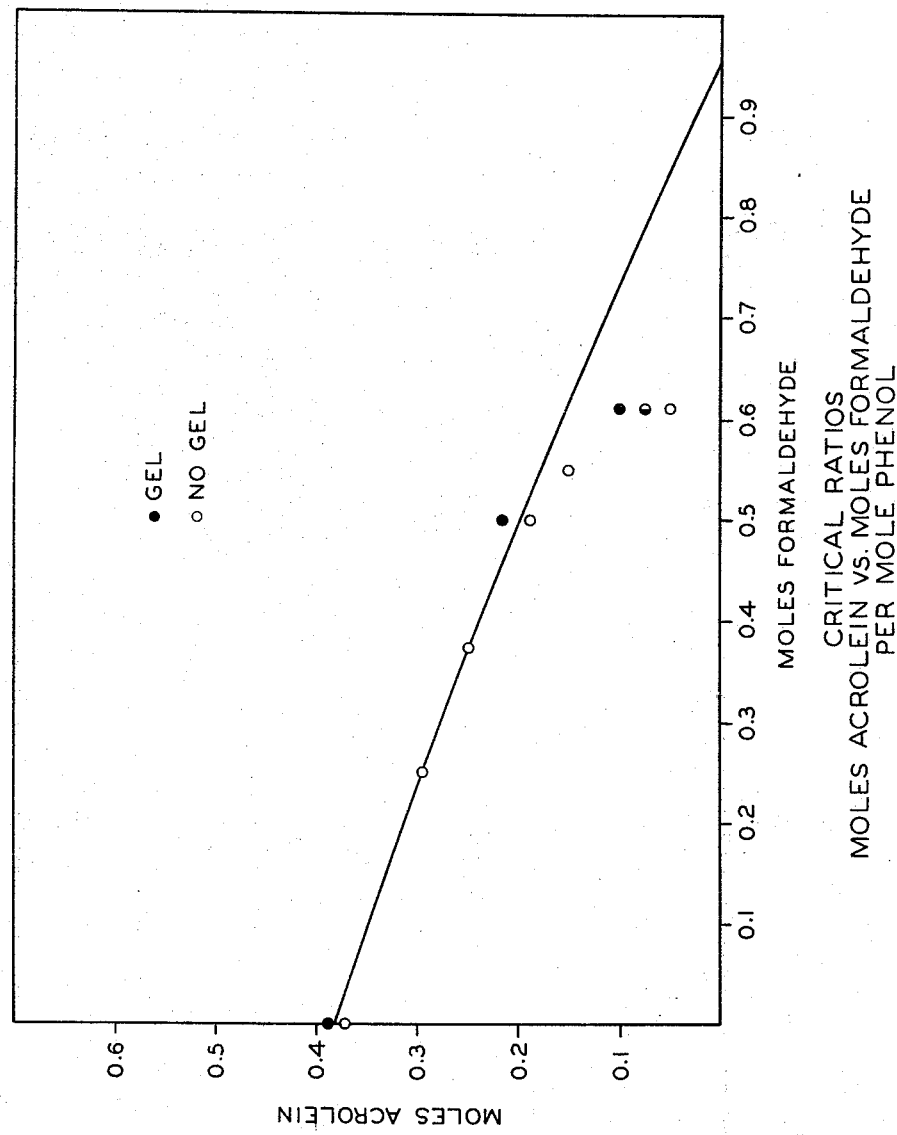

3,345,335
Patented Oct. 3, 1967

3,345,335
PHENOL-ACROLEIN RESINS AND THE PROCESS OF MAKING THEM USING A SULPHONIC ACID CATALYST
John G. Iacoviello, Somerville, and Max B. Mueller, Morristown, N.J., assignors to Allied Chemical Corporation, New York, N.Y., a corporation of New York
Filed Nov. 13, 1964, Ser. No. 410,862
11 Claims. (Cl. 260—55)

ABSTRACT OF THE DISCLOSURE

New synthetic resin compositions are prepared by condensing, at a temperature between about 135° and 180° C., a mixture comprising a phenol and acrolein in a mol ratio of about 1:1 to 4:1 in the presence of about 0.01 to 1.0% by weight of a sulphonic acid.

---

In the prior art, processes have been described for the production of resinous products from acrolein and phenol, but such processes do not lend themselves to the commercial production of easily worked resinous products. Thus, in U.S. Patent No. 1,607,293 of Moureu and Dufraisse there is described the condensation of phenol with acrolein in the presence of a basic condensing agent and it is stated that the process is likewise applicable to any other suitable bodies containing a phenolic group such as, for example, cresol or naphthol. However, the condensation of phenol with acrolein in the presence of a basic catalyst leads to the formation of products which lack uniformity, for there occurs not only a reaction of the phenol with the acrolein, but also an alkaline catalyzed auto-condensation of the acrolein. In the presence of a basic condensing agent the tendency of acrolein to condense with itself may be greater than its reactivity for the phenol. Later, in an article by Maksorow et al., which appears on pages 827 to 833 of volume 24 of Industrial and Engineering Chemistry for 1932, there is described formation of condensation products obtained by reaction of phenol and acrolein in teh presence of both acidic and basic condensing agents at 20° C., the temperature being maintained throughout the experiment. These investigators reacted phenol with acrolein in the presence of approximately 0.5% of an acidic or alkaline condensing agent based on the weight of the phenol employed; but only after from 3 to 42 days were they able to obtain solid products, the course of the reaction being studied merely by the change in the viscosity of the reaction mixture. Obviously, a process requiring so long a time for the production of condensation products is unsuitable for commercial application. While Maksorow et al. give but a meager description of the resinous products obtained by them from phenols and acrolein, the products are apparently of little interest for the purposes to which synthetic resins are customarily applied. They are reported to have the pungent odor of acrolein, a characteristic which may indicate incomplete reaction of the initial reactants.

Our investigations have disclosed that basic catalysts, such as sodium hydroxide, sodium carbonate, ammonium hydroxide and calcium hydroxide are ineffective as condensation catalysts for phenol and acrolein because they promote homopolymerization of acrolein. Among the acid catalysts, oxalic acid is effective but excessive amounts are needed to provide practical reaction rates. Sulfuric acid causes charring which may be reduced by the use of an aqueous system. Likewise, hydrochloric acid is an unsatisfactory catalyst since the use of this acid gives poor color and reaction of the hydrochloric acid with the resin as revealed by organic chlorine analysis of the resin.

It is therefore an object of this invention to produce valuable resinous products that will be of a uniform nature and will be produced in high yield.

It is another object of this invention to devise a process for producing resinous products that will be inexpensive and require very little reaction time, thereby resulting in an economical process.

Other objects of this invention will flow and become apparent from the subsequent disclosure.

We have now found that valuable resinous products in high yield can be obtained from a phenol and acrolein and from a phenol and acrolein containing formaldehyde, by heating together a mixture which has a composition ranging from about 1 to 4 mols of a phenol, 1 mol of acrolein, and about 0.01%–1% by weight, based on phenol and acrolein, of a sulfonic acid catalyst.

Two general types of resins may be prepared depending on the ratio of phenol to acrolein. The one-stage resin has a phenol to acrolein mol ratio of about 1 or less to 1. It has a melting point of about 85 to 90° C., and may be cured merely by heating to 160° C. without added catalyst, or at lower temperature in the presence of acid or ammonia. The two-stage resin uses a phenol to acrolein mol ratio of about 2 to 4 to 1, yielding resins having a melting point of about 110 to 150° C. and requires addition of a catalyst in order to effect curing. Such a curing catalyst for example may be hexamethylene tetramine, and has been found to be effective in amounts ranging from about 10 to about 15% by weight of resin. Both types of resins are water-insoluble, soluble in common organic solvents and light in color.

It is preferred to effect the condensation by gradual addition of acrolein alone or acrolein with formaldehyde to phenol in the presence of p-toluene sulfonic acid monohydrate under conditions of about 130–160° C. at atmospheric pressure for the two-stage resin and about 90° C. for the one-stage resin. Toluene may be used as inert reaction medium; in this case water of reaction (containing traces of acrolein) is removed as an azeotrope with toluene. The intermediate resin formed is treated to neutralize the catalyst, and volatile unreacted materials are stripped off. The phenol-acrolein or phenol-formaldehyde-acrolein condensate is then further heated to about 150–200° C. under vacuum until a condensate of the desired melting point is obtained. The resin is then poured, cooled, and ground or dissolved in a solvent.

Resins may also be prepared, as mentioned above, by replacement of part of the acrolein by a formaldehyde source such as trioxane. Substituted phenols such as p-cresol are also operative, as well as other phenols.

In the preferred process of our invention we heat together in the presence of about 0.1% by weight of p-toluene sulfonic acid, at a temperature of about 135–160° C., a mixture which has a composition of about 4 mols of phenol to about 1 mol of acrolein in a toluene solvent medium. Water of reaction is removed along with the toluene. The resin formed is isolated by neutralizing the catalyst with 50% sodium hydroxide solution, thereafter stripping off toluene. A 55 to 60 mm. mercury vacuum is applied over a two-hour period. When the melting point of the resin reaches 130° C., the resin is then poured.

was obtained. Acrolein conversion was 96.4 mol percent based on unrecovered starting material. Phenol conversion based on unrecovered starting material and analysis of product was 69.3 mol percent.

*Examples 2–4.*—The procedure of Example 1 was repeated using phenol/acrolein mol ratios of 4:1; 3:1; and 2.6:1. The results are tabulated in Table I below:

TABLE I.—TWO STAGE PHENOL-ACROLEIN RESINS [1]

| Example No. | Phenol/ Acrolein Mol Ratio | Percent Weight Balance | Free Phenol Content | Melting Point Resin | Approx. Number Average Molecular Weight |
|---|---|---|---|---|---|
| 2 | 4/1 | 98 | Less than 1% | 115 | 600 |
| 3 | 3/1 | 98 | do | 130 | 800 |
| 4 | 2.6/1 | 98 | do | 150 | 1,200 |

[1] All the values reported are average values of the combined runs.

In another preferred embodiment we heat together in the presence of about 0.1% by weight of p-toluene sulfonic acid, at a temperature of about 90° C., a mixture which has a composition of about 1 mol of phenol to about one mol of acrolein in a toluene solvent medium. Water of reaction is removed continuously and when all of the water has been removed, the reaction is neutralized with dilute sodium hydroxide solution. Toluene and unreacted phenol are thereafter stripped off at a temperature of about 150° C., and a pressure of 1–2 mm. Hg. The resin is then recovered.

Phenolic resins owe their usefulness to their ability to cure by gelation to an insoluble, infusible, infinite network. The gelation of the phenol-acrolein system is especially sensitive to reactant ratios and extent of reaction. A reproducible system is most readily obtained by operating at complete conversion at a reactant ratio just below critical gelation value. The accompanying graph, FIG. I, shows those critical points at which gelation is approached or accomplished, and their attendant respective concentrations.

The phenol-acrolein resins produced according to the process of our invention are also useful as bases for modifier of polyurethanes, polyesters, polycarbonates and nylons, as crosslinking agents for elastomers and as oxidation inhibitors.

The invention will be further described in conjunction with the following specific examples, but it is to be understood these are intended merely for the purposes of illustration and the invention is not to be interpreted as limited thereto.

*Example 1.*—612 gms. of phenol, 0.8 grams of p-toluene sulfonic acid monohydrate, and 130 gms. toluene were added to a two liter resin flask equipped with a stirrer, oil bath, water take-off tube and condenser. The mixture was heated with stirring to 90° while adjusting the oil bath temperature to a temperature of about 135 to 140° C. 167 ml. (140 gms.) acrolein were added dropwise over a half hour period, maintaining reflux at 135 to 140° C. Water of reaction was withdrawn continuously. After 43 ml. of H$_2$O solution had been removed, 0.4 gm. of 50% NaOH was added and toluene was stripped from the flask using a nitrogen bleed, while taking pot temperature to about 155 to 160° C. Thereafter 98 gms. of toluene solution were stripped off and a 55 to 60 mm. mercury vacuum was slowly applied over a 2 hour period. Pot temperature during stripping was 155 to 160° C. When the melting point reached 130° C. the resin was poured from the flask. 190 gms. of phenol were stripped and 534 gms. of resin were obtained. The resin analyzed at 4% free phenol using infra-red analysis. Water of reaction analyzed 5.26% acrolein, and toluene strippings 3.12% acrolein. An overall weight balance of 98.2%

*Examples 5–7.*—The general procedure for preparing phenol-acrolein-formaldehyde copolymer resins was that of Example 1. The phenol-acrolein-formaldehyde mol ratio was respectively: 1.0:0.33:0.15; 1.0:0.23:0.37; and 1.0:0.15:0.55. Trioxane was used as the formaldehyde source. Reaction temperature was maintained at 135 to 140° C. The results are tabulated in Table II below:

TABLE II.—PHENOL-ACROLEIN-FORMALDEHYDE RESINS

| Example No. | Phenol-Acrolein-Formaldehyde Ratio | Percent Weight Balance | Free Phenol Content | Melting Point Resin, ° C. |
|---|---|---|---|---|
| 5 | 1.0–0.33–0.15 | 98 | 3% | 135 |
| 6 | 1.0–0.23–0.37 | 98 | Less than 1% | 130 |
| 7 | 1.0–0.15–0.55 | 98 | do | 111 |

*Example 8.*—To a 1 liter resin flask equipped with a stirrer, thermometer, Barrett water take-off tube, condenser and a dropping funnel were adder 216 grams of p-cresol, 0.3 gm. p-toluene sulfonic acid and 60 gms. toluene. The flask was heated in an oil bath to 90° C. and 62 gms. of acrolein were added dropwise over a 1½ hour period while maintaining the temperature between 135 and 140° C. and removing the water of reaction as it formed. After collecting 20 ml. of water which analyzed 8% aldehyde, the reaction was neutralized with 20 ml. of one normal sodium hydroxide, and the reaction mixture was stripped of unreacted toluene and p-cresol. The reaction temperature was taken to 180° C., and a vacuum of 5 to 10 mm. mercury was applied. 34 gms. of toluene were removed that analyzed as 4.94% aldehyde. After stripping at reduced pressures for 1½ hours the resin was poured from the flask and weighed 242 gms. The stripped unreacted p-cresol and toluene weighed 34 gms. The trap contained 54 gms. of additional material.

The resin prepared possessed an extremely high melting point of 146° C., and was completely soluble in alcohol and acetone. The resin was cured with 15% hexamethylene tetramine to a hard infusible solid that was insoluble in alcohol and acetone.

*Examples 9–18.*—The procedure of Examples 1 and 5 was followed and to the resins so obtained a curing agent was added in varying amounts.

Table III below shows the results of the tests performed regarding the physical properties of the cured resins at four temperature levels and with various amounts of hexamethylene tetramine.

The resins of this invention were compared to the commercial resins Plaskon V–204 (a high temperature laminating resin), and Plaskon V–270 (a shell molding resin).

The figure in parenthesis is the percent by weight of hexamethylene tetramine used.

TABLE III.—PHYSICAL PROPERTIES OF TESTED RESINS

| Resin | Room Temp., Flexural | | 200° F., Flexural | | 250° F., Flexural | | 300° F., Flexural S | |
|---|---|---|---|---|---|---|---|---|
| | Stress | Modulus | Stress | Modulus | Stress | Modulus | Stress | Modulus |
| Ex. 9—Phenol Acrolein (5) | 7,620 | $6.9 \times 10^5$ | 4,930 | $4.3 \times 10^5$ | 3,160 | $1.8 \times 10^5$ | 210 | $1.7 \times 10^4$ |
| Ex. 10—Phenol Acrolein (10): | | | | | | | | |
| (a) | 9,810 | $6.5 \times 10^5$ | 7,600 | $4.3 \times 10^5$ | 5,230 | $3.3 \times 10^5$ | 3,660 | $2.0 \times 10^5$ |
| (b) | 8,840 | $7.0 \times 10^5$ | 6,170 | $4.6 \times 10^5$ | 5,930 | $3.4 \times 10^5$ | 3,370 | $2.3 \times 10^5$ |
| (c) | 10,010 | $6.7 \times 10^5$ | 9,180 | $5.4 \times 10^5$ | 9,340 | $5.0 \times 10^5$ | 7,360 | $3.8 \times 10^5$ |
| Ex. 11—Phenol Acrolein (15) | 5,390 | $7.2 \times 10^5$ | 3,420 | $5.9 \times 10^5$ | 4,550 | $5.2 \times 10^5$ | 2,780 | $4.6 \times 10^5$ |
| Ex. 12—Phenol Acrolein (10) | 9,020 | $7.2 \times 10^5$ | 7,790 | $5.6 \times 10^5$ | 7,850 | $4.3 \times 10^5$ | 5,510 | $3.1 \times 10^5$ |
| Ex. 13—Phenol Acrolein (10) | 9,310 | $7.0 \times 10^5$ | 7,310 | $5.2 \times 10^5$ | 8,090 | $3.7 \times 10^5$ | 1,330 | $9.8 \times 10^4$ |
| Ex. 14—Phenol Acrolein Formaldehyde (10) | 9,540 | $6.9 \times 10^5$ | 11,020 | $5.5 \times 10^5$ | 9,120 | $4.3 \times 10^5$ | 6,500 | $3.0 \times 10^5$ |
| Ex. 15—Phenol Acrolein Formaldehyde (10) | 11,140 | $6.7 \times 10^5$ | 9,120 | $5.4 \times 10^5$ | 10,990 | $4.3 \times 10^5$ | 6,140 | $2.8 \times 10^5$ |
| Ex. 16—Phenol Acrolein Formaldehyde (10) | 11,430 | $7.1 \times 10^5$ | 10,460 | $5.3 \times 10^5$ | 8,950 | $4.0 \times 10^5$ | 3,620 | $1.8 \times 10^5$ |
| Ex. 17—High Temp. Laminating Resin V-204 (8) | 9,360 | $7.9 \times 10^5$ | 6,870 | $2.7 \times 10^5$ | 610 | $4.2 \times 10^4$ | 130 | $5.8 \times 10^3$ |
| Ex. 18—Shell Molding Resin V-270 (10) | 12,000 | $7.1 \times 10^5$ | 11,090 | $5.9 \times 10^5$ | 6,980 | $4.6 \times 10^5$ | 5,620 | $3.2 \times 10^5$ |

It will be seen that all of the resins of the invention were (a) superior to the high temperature laminating resin, V-204 and (b) comparable to the shell molding resin, V-270 with respect to the physical properties.

*Example 19.*—188 gms. of phenol (2 mols), 134 ml. of acrolein (2 mols), 81 gms. of toluene, and 0.3 gm. p-toluene sulfonic acid were added to a 1 liter resin flask equipped with a stirrer, thermometer, water take-off tube, condenser, and oil bath. The mixture was heated to reflux, 92°, and water of reaction was removed continuously. When all of the water of reaction was removed, the reaction was neutralized with 10% excess dilute aqueous NaOH. Toluene and unreacted phenol were stripped from the flask using a nitrogen bleed, at a temperature of 150° and a pressure of 1-2 mm. Hg. 239 gms. of resin were recovered having a melting point of 99° and a free phenol content of 2.0%. Overall weight balance was 98.9%.

*Examples 20-22.*—The procedure of Example 19 was repeated except that the phenol to acrolein starting mol ratios were 1:1.25; 1:1.5; and 1:2 respectively. Table IV below summarizes the results.

We claim:
1. A process for producing a resinous condensation product which comprises heating together, at a temperature between 135° and 180° C., a reaction mixture comprising (a) phenol or p-cresol, (b) acrolein or a mixture of acrolein and formaldehyde, and (c) a sulphonic acid, said reaction mixture comprising between about 2 mols and 4 mols of (a) per mol of (b) and between 0.01 and 1.0% by weight of (c).

2. The process of claim 1 wherein the reaction mixture is heated at a temperature of about between 135° and 160° C.

3. The process of claim 1 wherein the amount of sulphonic acid is between about 0.01 and about 0.1% by weight.

4. The process of claim 1 wherein the sulphonic acid is p-toluene sulphonic acid.

5. The process of claim 4 wherein (a) and (b) are phenol and acrolein respectively in a mol ratio of 4:1.

6. A resinous condensation product prepared by the process of claim 1.

7. The process for producing a resinous condensation product which comprises heating together, at a temperature between about 135° and 160° C., a reaction mixture comprising (a) phenol or p-cresol, (b) acrolein or a mixture of acrolein and formaldehyde, and (c) a sulphonic acid, said mixture comprising between about 2 mols and 4 mols of (a) per mol of (b) and between about 0.01 and 1.0% by weight of (c) thereafter neutralizing and recovering the resin form.

8. The process of claim 7 wherein the acrolein or mixture of acrolein and formaldehyde is gradually added to the phenol or p-cresol at a temperature of about 135° to 160° C.

9. The process of claim 8 wherein the sulphonic acid is p-toluene sulphonic acid.

10. The product obtained by the process of claim 8.

TABLE IV.—ONE STAGE PHENOL-ACROLEIN RESINS

| Example No. | Phenol/Acrolein Mol Ratio | Melting Point Resin Resin | Percent Phenol Unreacted | Cure Characteristics | Solubility Properties |
|---|---|---|---|---|---|
| 19 | 1/1 | 99 | 13.9 | Cures at 160° C. with acids and bases | Completely soluble in acetone and "Solox." |
| 20 | 1/1.25 | 85 | 12.5 | do | Do. |
| 21 | 1/1.5 | 98 | 8.8 | Cures with heat alone and at room temp. with acids and bases. | Slightly insoluble in acetone and "Solox." |
| 22 | 1/2 | 94 | 6.0 | do | Slight soluble in acetone and "Solox." |

"Solox"—An alcohol-base, general-purpose solvent consisting of 100 parts of especially-denatured alcohol, 5 parts of ethyl acetate, and 1 part of aviation gasoline.

11. The product obtained by heating the product of claim 9 in the presence of between 10-15% by weight hexamethylenetetramine.

References Cited

UNITED STATES PATENTS 2,458,408  1/1949  Owens _____ 260—53
2,885,385  5/1959  Farnham _____ 260—55
3,248,368  4/1966  Biefeld _____ 260—57

OTHER REFERENCES

Martin: Chemistry of Phenolic Resins, TP 978 M38, 1956, pages 87–88.

WILLIAM H. SHORT, *Primary Examiner.*

H. SCHAIN, *Assistant Examiner.*